Aug. 27, 1957     H. E. ADAMS     2,804,125
ACCESSORY ARM REST

Filed March 7, 1955     3 Sheets-Sheet 1

INVENTOR.
HERMAN EDWARD ADAMS,
BY: Harold B. Hood.
ATTORNEY.

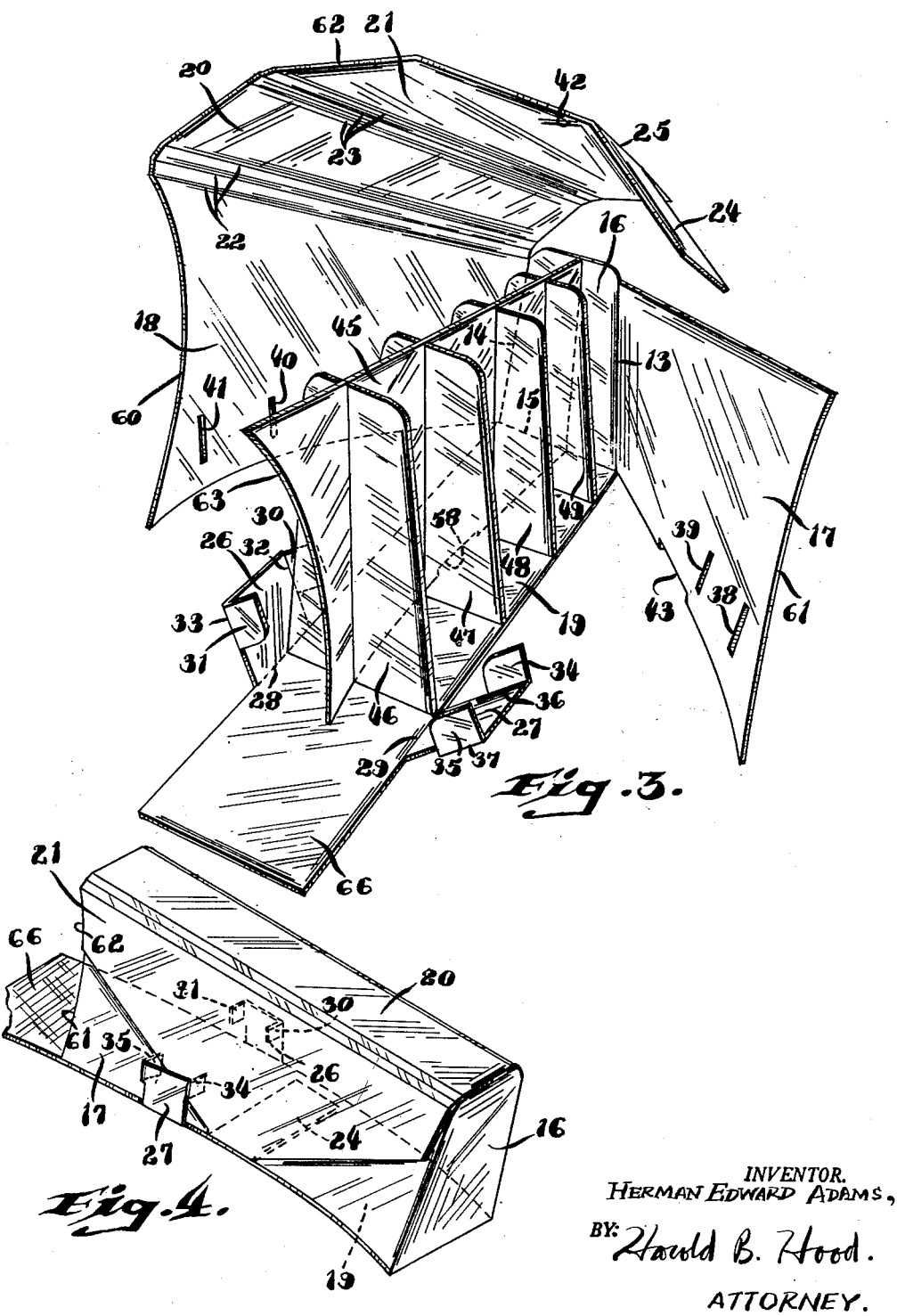

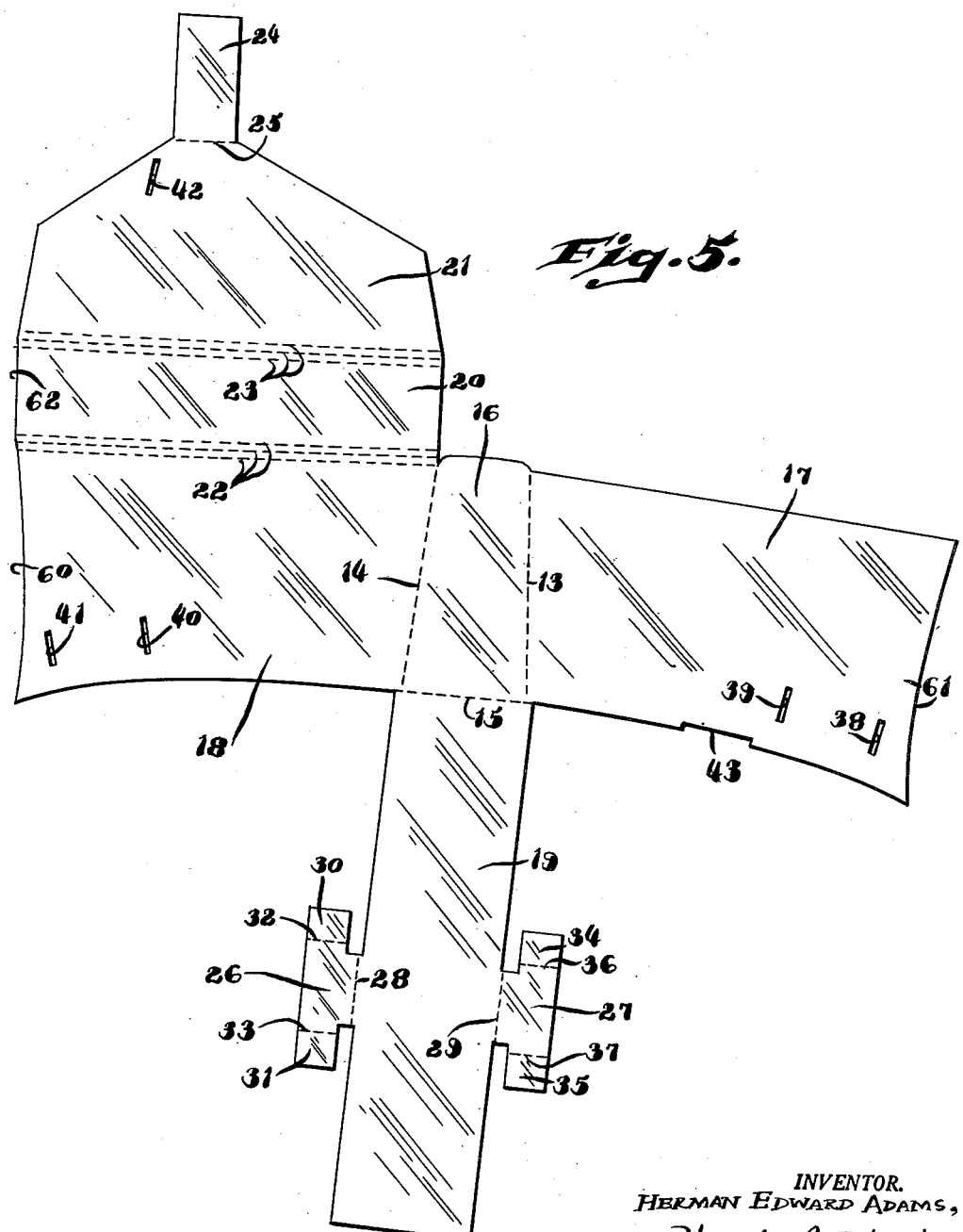

United States Patent Office 2,804,125
Patented Aug. 27, 1957

2,804,125

ACCESSORY ARM REST

Herman Edward Adams, Indianapolis, Ind.

Application March 7, 1955, Serial No. 492,587

1 Claim. (Cl. 155—112)

This invention relates to an arm rest and more particularly, to an arm rest and a blank therefor, for optional and readily removable use on the seat of an automobile.

An object of the invention is to provide a light weight arm rest of knock-down construction such that it will occupy comparatively little space when not in use.

A further object of this invention is to provide a blank for an arm rest which is in the form of a single flat piece of stiff but bendable material such that the blank occupies comparatively little space during storage, transportation and sale.

A further object is to provide an automobile arm rest and an internal reinforcing member therefor, said arm rest and reinforcing member being capable of being quickly and easily assembled and disassembled without the use of separate securing means such as staples or cement.

A further object of this invention is to provide a blank for an arm rest which can be quickly and easily bent and formed into an arm rest for an automobile.

A further object of this invention is to provide a knock-down arm rest which is light in weight, simple and sturdy in construction, economical to manufacture and dependable in use.

Further objects of the invention will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claim is not violated.

Fig. 3 is a perspective view of the arm rest showing the internal, reinforcing member and the one-piece blank in partially-folded relation thereabout;

Fig. 4 is a perspective view of the one-piece blank in folded, set-up form; and

Fig. 5 is a top view of the one-piece blank in its flat, unbent form, this view showing the score lines between the various panels of the finished arm rest.

Figure 1:
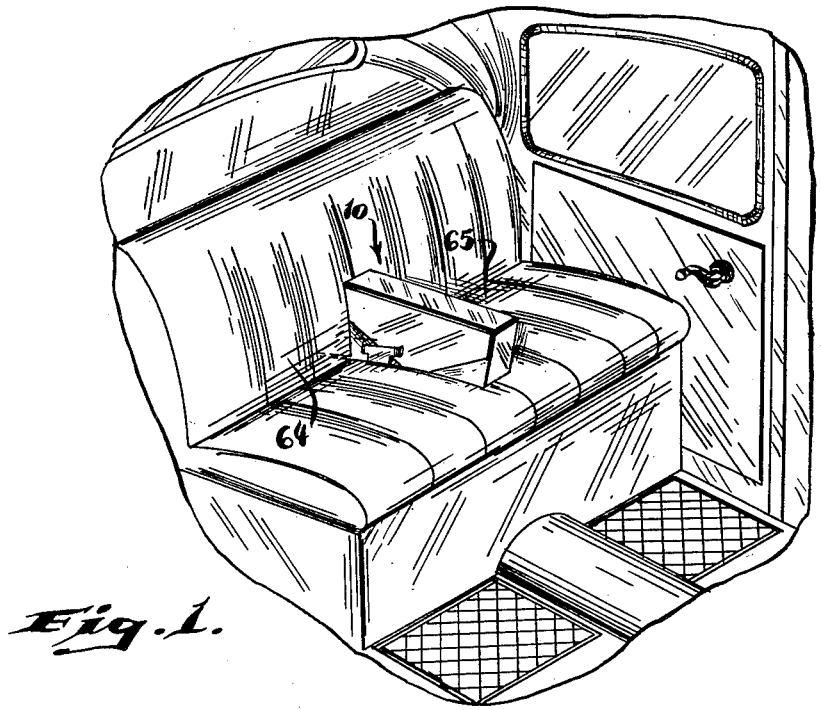
Fig. 1 is a perspective view of a portion of the interior of an automobile showing the arm rest which forms my invention in position on the seat.

Fig. 1 shows my improved arm rest 10 in position on the back seat of an automobile, though it will be understood, of course, that the device is equally adapted for use by the driver or his passenger on the front seat of the car. This arm rest 10 is formed from the flat one-piece blank 11 shown in Fig. 5 and the internal, reinforcing member 12 shown in Fig. 2.

Blank 11 is made from a sheet of stiff but bendable material such as, for instance, conventional corrugated board.

Score lines are provided to define the component parts of the integral blank, and to guide and facilitate bending the blank to the shape shown in Fig. 4.

As shown in Fig. 5, front panel or portion 16 is integral with each of side panel 17, side panel 18 and bottom panel 19. Score lines 13, 14 and 15, respectively, provide a line of demarcation between each of panels 17, 18 and 19, and front panel 16. Top portion or panel 20 is integral with side portion 18 on one side, and a side part 21 is integral with the opposite side of top panel 20. A parallel series of three spaced score lines 22 is provided in the blank 11 between top panel 20 and side panel 18. A similar series of three spaced score lines 23 is provided between top panel 20 and side part 21. A series of three such score lines may be provided instead of a single score line to effect a gentle curve at either side of the top panel rather than a fairly abrupt bend as at the other score line locations.

A tab 24 is integral with portion 21 and is defined at its inboard edge by score line 25. A tab 26 is integral with one lateral edge of bottom panel 19, and tab 27 is disposed opposite tab 26 and integral with the other lateral edge of bottom panel 19. Score lines 28 and 29 provide a line of demarcation between bottom panel 19 and tabs 26 and 27, respectively. Ears 30 and 31 may be bent up to positions at right angles with respect to the rest of tab 26 along score lines 32 and 33, respectively. Likewise, ears 34 and 35 may be bent up to positions at right angles with respect to the rest of tab 27 along score lines 36 and 37, respectively. Two parallel slots 38 and 39 are provided in side panel 17 and two parallel slots 40 and 41 are provided in side panel or portion 18. An additional slot 42 is provided in side part 21. A recess 43 of a depth approximately equal to or slightly less than the thickness of the material of the blank 11 is provided in one edge of side portion 17. The purpose and function of these tabs, slots and the recess will become apparent as the description proceeds.

It is apparent from Fig. 5 that the longitudinal dimension of bottom panel or portion 19 is substantially greater than the longitudinal dimension of any one of side panel 17, side panel 18 or top panel 20. The purpose and function of these relative longitudinal dimensions will likewise become apparent as the description proceeds.

Figure 2:
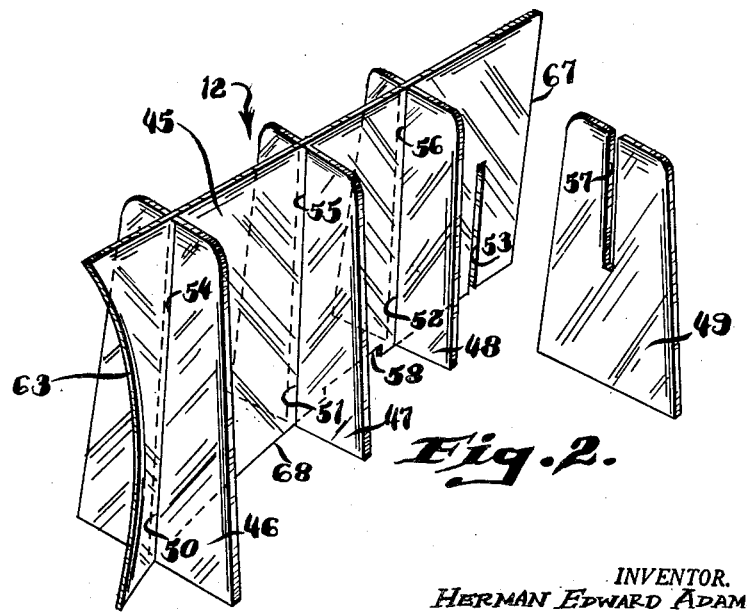
Fig. 2 is a perspective view of the internal, reinforcing member with one of the transverse sections being shown in exploded relation to the rest of the reinforcing member.

Referring to Fig. 2, internal, reinforcing member 12 will be described. This member may be formed from the same material as blank 11 and comprises a longitudinal section 45 with transversely extending sections 46, 47, 48 and 49, respectively. Longitudinal section 45 is provided with a plurality of slots 50, 51, 52 and 53, respectively, which are spaced longitudinally and open through the bottom edge thereof. Transverse sections 46, 47, 48 and 49 are respectively provided with slots 54, 55, 56 and 57. The slot in each of the transverse sections is placed in registry with its corresponding slot in longitudinal member 45 and the parts are telescoped together as clearly shown in Fig. 2. A recess 58 is provided in the lower, curved edge of longitudinal member 45 as shown in Figs. 2 and 3. The recess 58 is of a depth approximately equal to or slightly less than the thickness of the material of the blank 11 for a purpose later to become apparent.

In order to assemble and form the completed arm rest 10, internal, reinforcing member 12 is first assembled by telescoping transverse sections 46, 47, 48 and 49 onto longitudinal section 45 in the manner shown in Fig. 2. Blank 11 is then bent along the various score lines as indicated in Fig. 3. That is, referring to Fig. 5, side panels 17 and 18, and bottom panel 19 are bent forwardly out of the plane of the drawing along score lines 13, 14 and 15, respectively. Now, reinforcing member 12 may be placed on bottom panel 19 with the straight vertical edge 67 of longitudinal member 45 in abutting engagement with front panel 16. Blank 11 is then bent about score lines 22 and 23 to bring top panel 20 into engagement with the upper edges of reinforcing member 12, and to bring side part 21 into overlapping engagement with side panel 17 as shown in Fig. 4. Before side part or additional portion 21 is moved into overlapping engagement with side panel 17, tab 24 is first bent along score line 25; and as the overlapping relation is established, the leading edge of tab 24 is inserted in recess 43, under side panel 17 and atop bottom panel 19. Portion 21 of blank 11 is moved inwardly against side panel 17 and tab 24 is thereby inserted along the top surface of bottom panel 19 and through recess 58 in the lower edge of longitudinal member 45. Since recesses 43 and 58 are of a depth equal to or slightly less than the thickness of the material of blank 11, and because of the inherent stiffness of the material, tab 24 will be securely, frictionally retained in the position shown in dotted lines in Fig. 4.

It is apparent from a comparison of Figs. 4 and 5 that when blank 11 is folded to the shape shown in Fig. 4, slot 39 in side panel 17 registers with slot 42 in overlapping side part 21. Tabs 26 and 27 are bent at score lines 28, 32, 33, 29, 36 and 37, respectively, to the shape shown in Fig. 3. Ears 30 and 31 on tab 26 fit into slots 40 and 41, respectively, in side panel 19; and ears 34 and 35 on tab 27 fit into aligned slots 39 and 42, and slot 38, respectively. Slots 38, 39, 40, 41 and 42 are of a width equal to or slightly less than the thickness of the material of which the blank 11 is formed, and therefore, tab ears 30, 31, 34 and 35 will be securely, frictionally retained in the position shown in dotted lines in Fig. 4.

Curved edges 60, 61 and 62 of blank 11 and curved edge 63 of reinforcing member 12 are coextensive with each other when the arm rest is formed to the shape shown in Fig. 4, and these edges conform to the curve of the back cushion 64 as shown in Fig. 1. The lowermost edge 68 of longitudinal member 45 defines a concave curve, and bottom panel 19 which abuts this edge is therefore likewise curved to conform to the shape of seat cushion 65.

Since the longitudinal dimension of bottom panel 19 is greater than that of side panels 17, 18 and top panel 20 as previously pointed out, bottom panel 19 projects rearwardly in the form of a tail 66. This tail fits between the back and seat cushions 64 and 65, respectively, to hold the arm rest securely in position against accidental displacement, while permitting ready removal when desired.

It is obvious that blank 11 and reinforcing member 12 in disassembled, knocked-down condition can be packed together in a flat package. A substantial number of such packages could be stacked one on top of another to form a bundle of desired height. The arm rest could be stored, transported and marketed while in this flat form and would thereby occupy comparatively little space during this time.

Blank 11 and internal reinforcing member 12 are easily manufactured by simple cutting and/or punching operations. Due to the inexpensive material of which the parts of the arm rest are formed, along with the space-saving characteristics and simple process of manufacture pointed out above, it is apparent that my novel arm rest can be made available to the public at a very low cost.

The arm rest could be sold to the consumer in its flat, knocked-down condition since the process of assembling it is very simple and no additional securing means such as staples or glue is required. Alternatively, the retailer could assemble the arm rest and sell it in that condition. If desired, the outer surface of the blank 11 may be printed or otherwise decorated to blend with the appearance of conventional automobile seat upholstery.

I claim as my invention:

An arm rest comprising a single, unitary piece of stiff but bendable material, said piece comprising a front panel, two side panels and a bottom panel, said side panels and said bottom panel each being angularly related with respect to said front panel and integral therewith, a top panel spaced from and overlying said bottom panel, said top panel being angularly related to both of said two side panels and integral with one of said two side panels, and a side part angularly related with respect to said top panel and integral therewith, said side part being in overlying engagement with the other of said two side panels and detachably secured thereto, each of said two side panels and said side part being provided with slot means, and tab means projecting from the lateral edges of said bottom panel, said tabs being in frictional engagement with said slot means to detachably hold said side panels in angularly related position with respect to said bottom panel.

References Cited in the file of this patent
UNITED STATES PATENTS

| | | |
|---|---|---|
| 1,182,585 | Richardson | May 9, 1916 |
| 2,634,040 | Kaufman | Apr. 7, 1953 |
| 2,678,682 | Thomas | May 18, 1954 |